US012712936B2

(12) United States Patent
Ernström et al.

(10) Patent No.: US 12,712,936 B2
(45) Date of Patent: Aug. 18, 2026

(54) QUALITY OF EXPERIENCE DIRECTED NETWORK RESOURCE HANDLING

(71) Applicant: Telefonaktiebolaget LM Ericsson (publ), Stockholm (SE)

(72) Inventors: Lars Ernström, Mountain View, CA (US); Jonathan Lynam, San Jose, CA (US); Dmitri Krylov, Sunnyvale, CA (US); Joel L. Wittenberg, El Cerrito, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/834,203

(22) PCT Filed: Jan. 29, 2022

(86) PCT No.: PCT/IB2022/050786
§ 371 (c)(1),
(2) Date: Jul. 29, 2024

(87) PCT Pub. No.: WO2023/144589
PCT Pub. Date: Aug. 3, 2023

(65) Prior Publication Data

US 2025/0175514 A1 May 29, 2025

(51) Int. Cl.
*G06F 13/00* (2006.01)
*H04L 65/612* (2022.01)
*H04L 65/80* (2022.01)

(52) U.S. Cl.
CPC ............ *H04L 65/80* (2013.01); *H04L 65/612* (2022.05)

(58) Field of Classification Search
CPC ....... H04L 65/80; H04L 65/612; H04W 28/18
(Continued)

(56) References Cited

U.S. PATENT DOCUMENTS 9,807,644 B2 * 10/2017 Ma ...................... H04W 72/569
9,998,338 B2 * 6/2018 Dao ........................ H04L 65/80
(Continued)

FOREIGN PATENT DOCUMENTS

WO 2015035232 A2 3/2015

OTHER PUBLICATIONS

ITU-T G.1072, "Series G: Transmission Systems and Media, Digital Systems and Networks, Multimedia Quality of Service and performance—Generic and user-related aspects, Opinion model predicting gaming quality of experience for cloud gaming services," Jan. 2020, 20 pages, International Telecommunications Union (ITU).
(Continued)

*Primary Examiner* — Kenneth R Coulter
(74) *Attorney, Agent, or Firm* — Nicholson De Vos Webster & Elliott LLP

(57) ABSTRACT

A method for allocating network resources among a set of real-time video flows to maximize a total measured quality of experience (QoE) including detecting a state change, determining whether a state network resource allocation can be optimized after the state change, where the determining compares an output utility value of a utility function over the set of real-time video flows to a current utility value of the
(Continued)

network resource allocation, and selecting an optimal network resource allocation indicated by the utility function, in response to determining the state change can be optimized.

20 Claims, 7 Drawing Sheets

(58) Field of Classification Search
USPC .................. 709/224, 226; 718/104, 102, 100
See application file for complete search history.

(56) References Cited

U.S. PATENT DOCUMENTS

| | | | | |
|---|---|---|---|---|
| 10,116,712 | B2 * | 10/2018 | Ma | H04L 65/765 |
| 10,645,617 | B2 * | 5/2020 | Talbert | H04W 48/06 |
| 10,680,911 | B2 | 6/2020 | Ramakrishnan et al. | |
| 11,363,345 | B2 * | 6/2022 | Wang | H04L 65/756 |
| 11,716,654 | B2 * | 8/2023 | Talbert | H04W 24/02 370/329 |
| 12,262,097 | B2 * | 3/2025 | Wang | H04L 65/70 |
| 2015/0264098 | A1 | 9/2015 | Dao et al. | |
| 2016/0028595 | A1 * | 1/2016 | Ramakrishnan | H04L 65/60 709/226 |
| 2016/0219088 | A1 * | 7/2016 | Ma | H04L 65/765 |
| 2020/0068440 | A1 * | 2/2020 | Talbert | H04W 28/16 |
| 2020/0314503 | A1 * | 10/2020 | Wang | H04L 65/762 |

OTHER PUBLICATIONS

ITU-T G.1072, "Series G: Transmission Systems and Media, Digital Systems and Networks, Multimedia Quality of Service and performance—Generic and user-related aspects, Opinion model predicting gaming quality of experience for cloud gaming services, Corrigendum 1," Oct. 2020, 20 pages, International Telecommunications Union (ITU).

ITU-T P.1204, "SERIES p. Telephone Transmission Quality, Telephone Installations, Local Line Networks, Models and tools for quality assessment of streamed media, Video quality assessment of streaming services over reliable transport for resolutions up to 4K," Jan. 2020, 22 pages, International Telecommunications Union (ITU).

Zhi Li et al., "Toward A Practical Perceptual Video Quality Metric," Jun. 6, 2016, 22 pages, Netflix Technology Blog, downloaded from https://netflixtechblog.com/toward-a-practical-perceptual-video-quality-metric-653f208b9652 on Dec. 10, 2021.

Wikipedia, "Dynamic Adaptive Streaming over HTTP," Dec. 7, 2021, 9 pages, downloaded from https://en.wikipedia.org/wiki/Dynamic_Adaptive_Streaming_over_HTTP on Dec. 10, 2021.

Janne Seppänen et al., "QoE-Driven Network Management for Real-Time Over-the-Top Multimedia Services," Apr. 2013, 7 pages.

Peerapong Uthansakul et al., "QoE-Aware Self-Tuning of Service Priority Factor for Resource Allocation Optimization in LTE Networks," Jan. 2020, pp. 887-900, IEEE Transactions on Vehicular Technology, vol. 69, No. 1.

* cited by examiner

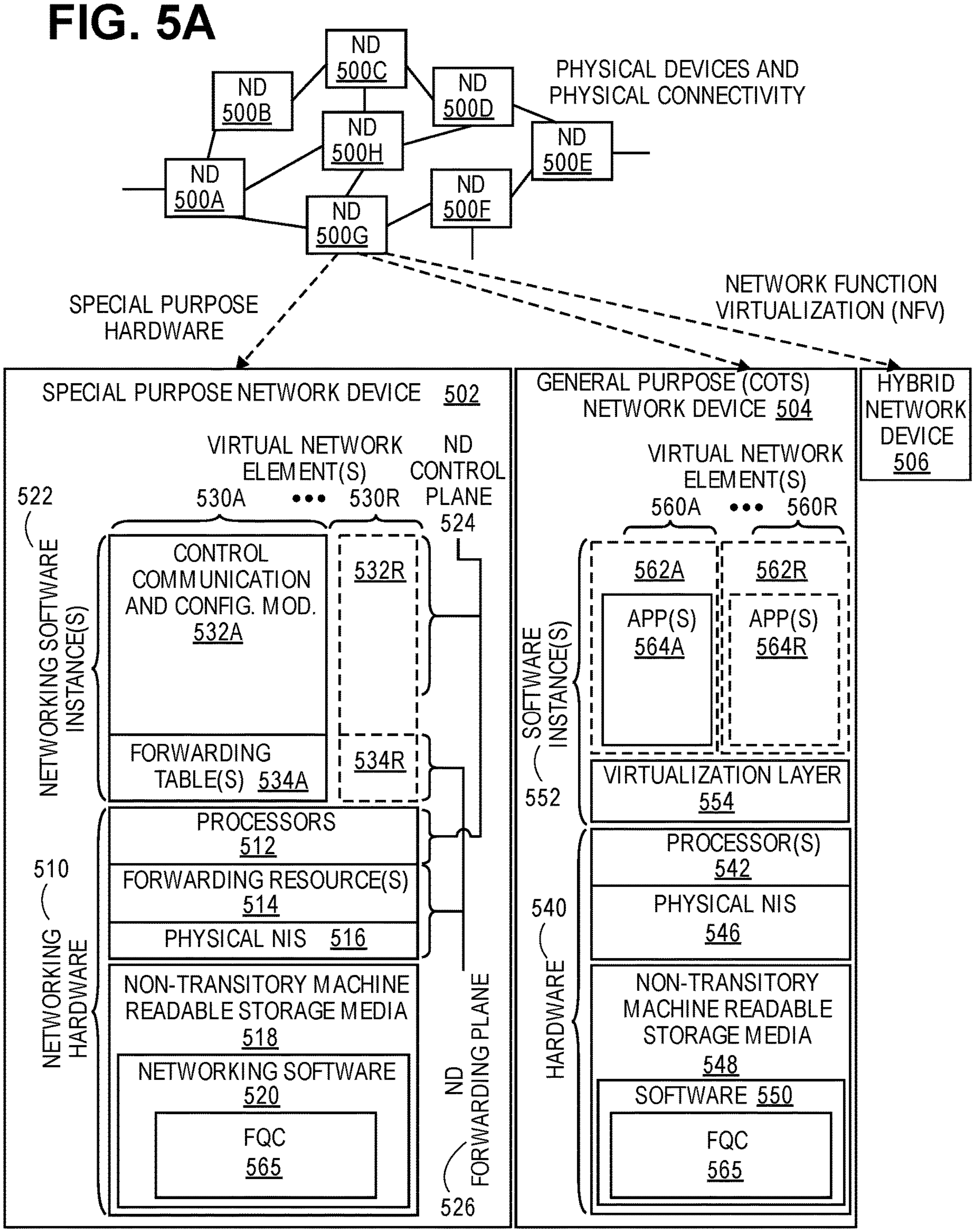

PHYSICAL DEVICES AND PHYSICAL CONNECTIVITY

SPECIAL PURPOSE HARDWARE

NETWORK FUNCTION VIRTUALIZATION (NFV)

SPECIAL PURPOSE NETWORK DEVICE 502

VIRTUAL NETWORK ELEMENT(S) 530A ••• 530R

ND CONTROL PLANE 524

522 NETWORKING SOFTWARE INSTANCE(S)

CONTROL COMMUNICATION AND CONFIG. MOD. 532A

532R

FORWARDING TABLE(S) 534A

534R

510 NETWORKING HARDWARE

PROCESSORS 512

FORWARDING RESOURCE(S) 514

PHYSICAL NIS 516

NON-TRANSITORY MACHINE READABLE STORAGE MEDIA 518

NETWORKING SOFTWARE 520

FQC 565

ND FORWARDING PLANE 526

GENERAL PURPOSE (COTS) NETWORK DEVICE 504

VIRTUAL NETWORK ELEMENT(S) 560A ••• 560R

552 SOFTWARE INSTANCE(S)

562A

APP(S) 564A

562R

APP(S) 564R

VIRTUALIZATION LAYER 554

540 HARDWARE

PROCESSOR(S) 542

PHYSICAL NIS 546

NON-TRANSITORY MACHINE READABLE STORAGE MEDIA 548

SOFTWARE 550

FQC 565

HYBRID NETWORK DEVICE 506

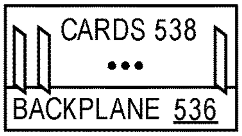

FIG. 5B

CENTRALIZED APPROACH (SDN) 574

DISTRIBUTED APPROACH 572

APPLICATION(S) 588

APPLICATION LAYER 586

NORTH BOUND INTERFACE 584

VIRTUAL NETWORK(S) 592

CENTRALIZED CONTROL PLANE 576

NETWORK CONTROLLER 578

CENTRALIZED REACHABILITY AND FORWARDING INFO. MOD. 579

FQC 581

SOUTH BOUND INTERFACE 582

DATA PLANE 580

NE 570A

NE 570B

NE 570C

NE 570D

NE 570E

NE 570F

NE 570G

NE 570H

NE 570I

NE 570D

NE 570E

NE 570F

SINGLE VNE 570T

ND 500A

VNE 570A.1

ND 500H

VNE 570H.1

QUALITY OF EXPERIENCE DIRECTED NETWORK RESOURCE HANDLING

CROSS-REFERENCE TO RELATED APPLICATIONS

This application is a National stage of International Application No. PCT/IB2022/050786, filed Jan. 29, 2022, which is hereby incorporated by reference.

TECHNICAL FIELD

Embodiments of the invention relate to the field of network resource handling; and more specifically, to a process for quality of experience (QoE) based network resource allocation.

BACKGROUND ART

Quality of experience (QoE) is a measure or metric relating to a customer experience of a service. Services can encompass any set of functions executed to provide functionality to the customer by a set of electronic devices. Examples of services can include streaming video services, gaming, web browsing, and similar services. QoE can be measured using various instrumentation to evaluate an entire service experience, but often with specific focus on telecommunication related aspects of the experience.

Some standards based approaches have been taken with relation to defining and measuring QoE. In one example, the International Telecommunication Union (ITU) has defined QoE as "[t]he degree of delight or annoyance of the user of an application or service. It results from the fulfillment of his or her expectations with respect to the utility and/or enjoyment of the application or service in the light of the user's personality and current state." This definition was set forth in Recommendation ITU-T P.10. Various definitions of QoE can be used with the ITU definition recently finding wide acceptance.

QoE provides a measure to enable operators to understand the strengths and weaknesses of their services and how to improve them. QoE can encompass a wide array and organization of characteristics or factors that can be utilized in generating QoE metrics. QoE can be used in conjunction with any type of service, but often has particular relevance for video and/or gaming services due to their high bandwidth and low latency requirements. Poor network resource usage and performance can significantly affect the user's experience. In these cases, the measure of QoE can be vital to providing successful services.

SUMMARY

In one embodiment, A method for allocating network resources among a set of real-time video flows to maximize a total measured quality of experience (QoE) including detecting a state change, determining whether a state network resource allocation can be optimized after the state change, where the determining compares an output utility value of a utility function over the set of real-time video flows to a current utility value of the network resource allocation, and selecting an optimal network resource allocation indicated by the utility function, in response to determining the state change can be optimized.

In another embodiment, a non-transitory machine-readable medium is presented having stored therein a computer program code which when executed by a computer carries out the method for allocating network resources among a set of real-time video flows to maximize a total measured quality of experience (QoE). The method includes detecting a state change, determining whether a state network resource allocation can be optimized after the state change, where the determining compares an output utility value of a utility function over the set of real-time video flows to a current utility value of the network resource allocation, and selecting an optimal network resource allocation indicated by the utility function, in response to determining the state change can be optimized.

In a further embodiment, an apparatus is presented that includes a non-transitory machine-readable storage medium that stores code for a Flow QoE Controller (FQC). The apparatus further includes a set of one or more processors that execute the FQC. The FQC includes functions that detecting a state change, determining whether a state network resource allocation can be optimized after the state change, where the determining compares an output utility value of a utility function over the set of real-time video flows to a current utility value of the network resource allocation, and selecting an optimal network resource allocation indicated by the utility function, in response to determining the state change can be optimized.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement a special-purpose network device according to some embodiments of the invention.

DETAILED DESCRIPTION

Figure 1:
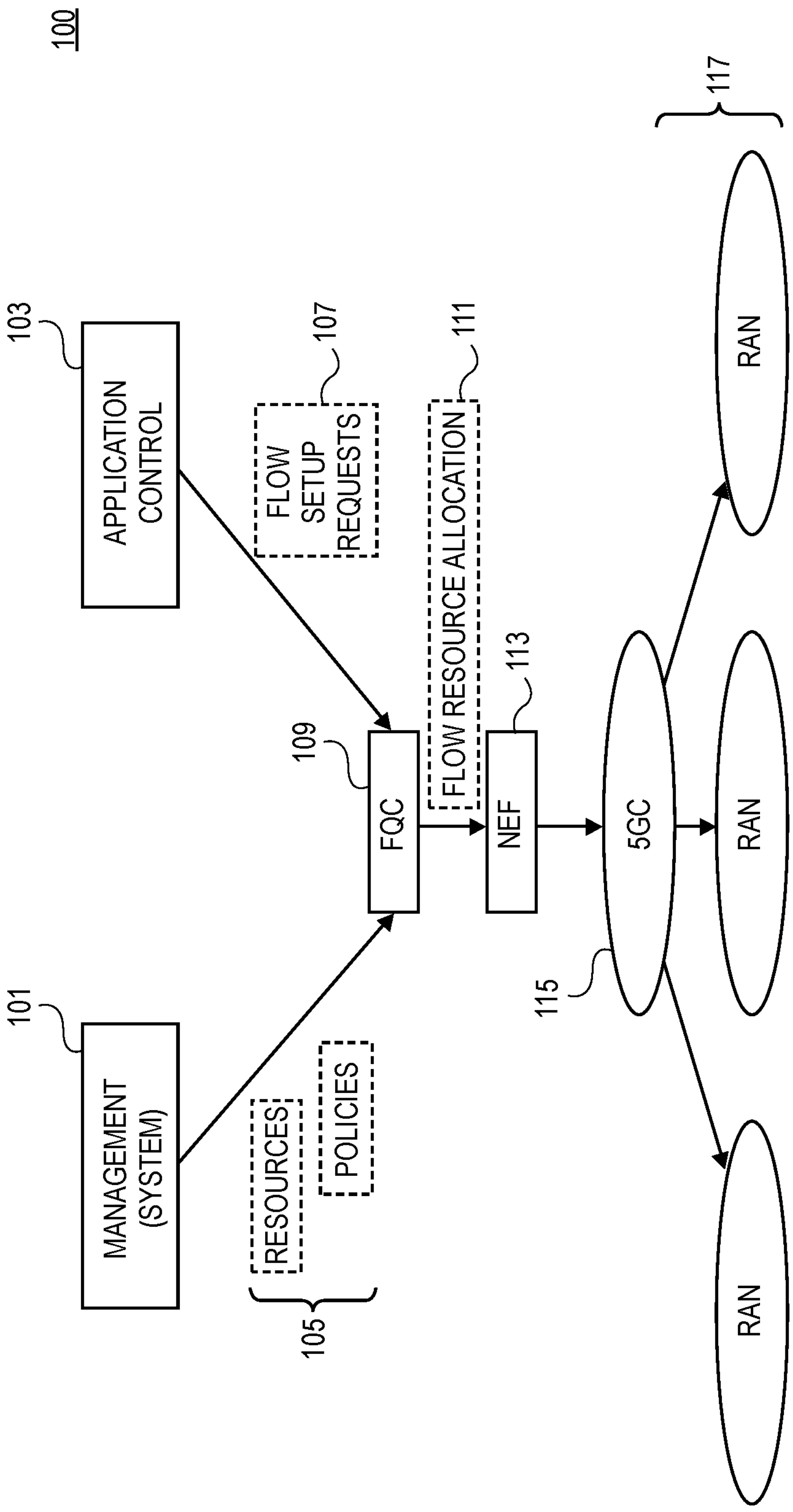
FIG. 1 is a diagram of one embodiment of the operation of the total quality of experience (QoE) resource allocation mechanism in a telecommunication network.

The following description describes methods and apparatus for managing video streaming bandwidth allocation. The embodiments allocate resources (e.g., bandwidth) for a set of real-time video streams by calculating a quality of experience (QoE) metric for each of the real-time video streams across a range of possible resource allocation permutations. The resource allocation with the greatest total QoE value for the set of real-time video streams is utilized until there is a change in state for the set of real-time video streams that triggers a reevaluation of the resource allocation. In some embodiments, the resource allocation determinations are in the context of a radio access network (RAN) of a cellular telecommunications system.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical Nis (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Growth in fixed and mobile data traffic volumes is largely due to the increased use of video streaming in applications of user devices. Network bandwidth (e.g., radio access network (RAN) bandwidth or core network bandwidth) is typically shared fairly among data traffic flows including those data traffic flows that provide streaming real-time video. The bandwidth sharing can be allocated using, for example, round robin scheduling. Depending on the applications and use cases, the amount of bandwidth needed by each real-time video stream will vary considerably and therefore some users may get less bandwidth than what is needed for a satisfactory experience, while other users get more than what is needed. The way video transport is performed today, many video applications will attempt to use all available bandwidth, even if it doesn't lead to substantial improvements in video quality.

For example, with dynamic adaptive streaming over hypertext transfer protocol (HTTP) (DASH), the video is transported in chunks and if the transport is faster than expected, then the video application may choose to use more available bandwidth for the video. After a certain amount of bandwidth allocation, adding additional bandwidth will have diminishing returns in terms of added quality as perceived by a user. Wasting application bandwidth in such scenarios is energy inefficient and also likely not efficient in terms of delivering quality to all users. By use of a Quality of Experience (QoE) metric, measuring the performance of the video service from the user or viewer perspective, it is possible to share bandwidth in a way that optimizes the aggregate QoE across users or in terms of Service Level Agreements (SLAs) that are expressed in terms of QoE. A mechanism for implementing this QoE aware sharing is provided by the embodiments.

Certain video applications, for example, cloud gaming and remote equipment operation have strict real-time streaming requirements. In contrast to typical internet video sharing such as YouTube, where buffering of many seconds of video frames is done to account for packet loss and varying latency, real-time streaming can afford only milliseconds of buffering because users expect an immediate response, visualized in the video, to user actions (inputs). As a consequence, real-time streaming has strict latency and jitter requirements. As used herein 'real-time' video streaming is distinguished from general video streaming in that the 'real-time' video is continuously responsive to user inputs and/or is similarly interactive. Latency and jitter impact the input quality, determine the responsiveness of the application, and affect the temporal quality of the video, which can be manifested as degradation in the video due to frame freezes/repeats, and similar issues.

Spatial video quality is affected by compression artefacts such as blockiness and blur. There are a number of alternatives to basic spatial quality metrics such as PSNR (Peak Signal-to-Noise Ratio). Other spatial quality metrics include SSIM (Structural SiMilarity) and VMAF (Video Multimethod Assessment Fusion), which are metrics that take human visual perceptual characteristics into account. International Telecommunication Union (ITU) telecommunication standardization sector (ITU-T) G.1072 is a standard targeting cloud gaming QoE. ITU-T P.1204 is another standard addressing video quality assessment of video streaming services including spatial (P.1204.3) as well as input and temporal metrics.

Existing traffic schedulers and resource reservation systems operate at the level of priorities, bitrates and latencies in the allocation of network resources, in particular near the edge of telecommunication networks. In case of a radio base station in a RAN of a telecommunication network, the network resources are the combination of timeslots and subcarriers on which data can be transmitted to user devices often referred to as user equipment (UE). In some embodiments, the radio base station assigns each UE (or, its radio bearer, which defines the manner of signaling (e.g., as signaling radio bearers or data radio bearers) between the radio base station and the UE in the RAN) an equal allocation of radio resources. In the case of video transport, e.g., for real-time or live streaming, which are used herein interchangeably, the problem is that fairness in terms of allocation of resources (i.e., equal allocation) is generally not the optimal use of the network resources. Due to variation in content and video format such as resolution, frame rate and encoding, the resource needs of applications on different UEs vary. For example, a video with talking heads on a fixed background can be encoded to a low bit rate while keeping a high quality whereas a video with many moving intricate objects (e.g., sports broadcasts) requires a higher bit rate for a similar quality. In such a scenario, sharing bandwidth equally between two UEs with these two types of video content is inefficient in terms of delivering quality. However, this is exactly what the prior art does in RAN bandwidth allocation.

The embodiments overcome these drawbacks of the prior art. The embodiments provide a system and process that allocates network resources for transport of video traffic flows in a manner to maximize a utility function expressed in terms of the Quality of Experience (QoE) delivered to users of the individual video flows. For example, the utility function can be expressed as the aggregate Quality of Experience (QoE) across all users of a set of real-time video flows.

The system and processes use QoE maps that define an estimated QoE metric value resulting from a given network resource allocation, e.g., a given bitrate allocation, to individual video flows. A QoE map can be produced leveraging QoE metrics such as VMAF, G.1072 or P.1204, or by performing mean opinion score (MOS) studies applicable to targeted video services. Multiple QoE maps can be generated and used for each video flow or for different video flows in a set of real-time video flows, where different QoE maps are used for different categories of video traffic flows. The QoE maps are used to determine an optimal strategy in sharing network resources among flows. The QoE maps are pre-computed and can be utilized quickly and efficiently to provide estimated QoE metric values for each network resource allocation for each video flow.

In some embodiments, a QoE map includes a function mapping application flow bitrate to a QoE metric value. As mentioned, VMAF can be used to define this function for certain content. VMAF is reasonably consistent when applied across content of similar kind. If the application changes the content, e.g., through a scene change, the function may need to be changed. Optionally, the QoE map can contain component functions capturing delay and jitter sensitivity. For cloud gaming applications there are functions defined in ITU G. 1072 for temporal and input quality metrics.

Broadly, the embodiments provide a total QoE resource allocation mechanism that allocates network resources to application packet flows based on the effect it will have on the QoE for the user(s) of the application. This knowledge is used to implement policies specified in terms of quality levels while making efficient use of available network resources. The network resources are put to better use and can deliver improved QoE to end users of video-based services overall. Video flow data traffic (i.e., data packets that are part of video flows) constitute a major portion of network traffic and telecommunication network operators that implement the total QoE resource allocation mechanism in their networks can deliver improved quality video transport and increased revenues. The total QoE resource allocation mechanism enables telecommunication network operators to support new types of video-based applications with real-time characteristics and requirements in an efficient and scalable manner.

FIG. 1 is a diagram of one embodiment of the operation of the total QoE resource allocation mechanism in a telecommunication network. The total QoE resource allocation mechanism can be implemented by a component referred to herein as a FQC (Flow QoE Controller) 109 that directs the traffic management handling of network flows including real-time video flows based on QoE information. The FQC 109 can interact with, or act as a part of a larger network management system 101. The FQC 109 can also interact with or be part of an application control system 103. The FQC 109 can be a set of software and/or hardware implemented functions that provide the QoE based network allocation processes described herein. The FQC 109 can be executed at any location within the telecommunication network 100. The FQC 109 can be structured as a single entity executed at a single point in the network 100 or it can be a distributed set of functions.

The FQC 109 can control the allocation of network resources to application flows through interaction with a 5GC ($5^{th}$ generation core) NEF (network exposure function) 113 or similar network functions for 5G networks. In other embodiments within other types of telecommunication networks (e.g., 4G LTE ($4^{th}$ generation long term evolution)) the FQC 109 can interact with similar equivalent functions to the NEF to implement the operations of the FQC 109.

The FQC 109 utilizes a set of QoE maps that associate flow network characteristics, e.g., data for bitrate, delay and packet loss, with a QoE metric value. The QoE maps can be provided to the FQC 109 and stored local to the FQC 109 (e.g., in a local database or similar storage mechanism), can be computed by the FQC 109 based on collected network metrics (e.g., from the RANs 117) or by similar mechanisms. The FQC 109 can use multiple QoE maps for different categories of flows, e.g., for different video resolution, frame rate, encoder, and content type. Any number, variety, and combination of the QoE maps can be utilized per video flow. In some embodiments, each QoE map has a set of characteristics that correlate the QoE map with different types of video flows. The FQC 109 can select the QoE maps with the greatest similarity in terms of characteristics between the QoE map and the video flows. Thus, even in cases where a QoE map is not present with the exact characteristics of the video flow (i.e., the video flow is a DASH format video flow), a closest approximate QoE map can be selected and chosen to represent the QoE metrics for the video flow. In further embodiments, QoE maps are provided by each video source, client (i.e., UE) application, management system 101, application control system 103, or similar components in the network 100.

The FQC chooses the QoE map for each flow based on all available information about the flow, which could include knowledge about the typical genre of game, style of video or other information. The FQC can select a QoE map through various means, for example, by explicit flow reservation message or function call, or inferred through flow classification, e.g., flow category indicated by data in control message, function call, or flow packet data. The selected flow QoE map can be fixed for the lifetime of a video flow, or it can be dynamically changed in response to changes in the video flow characteristics, by provision of new QoE maps that are a better fit for the video flow, or by similar means as described herein. For example, a QoE map change can be triggered by the FQC 109 if the characteristics of the video changes, for example from a cinematic to action scene in a computer game. These changes can be detected by the FQC 109 or the video source can include markers or similar indicators in the video flow to indicate the video format or content changes.

Figure 2:
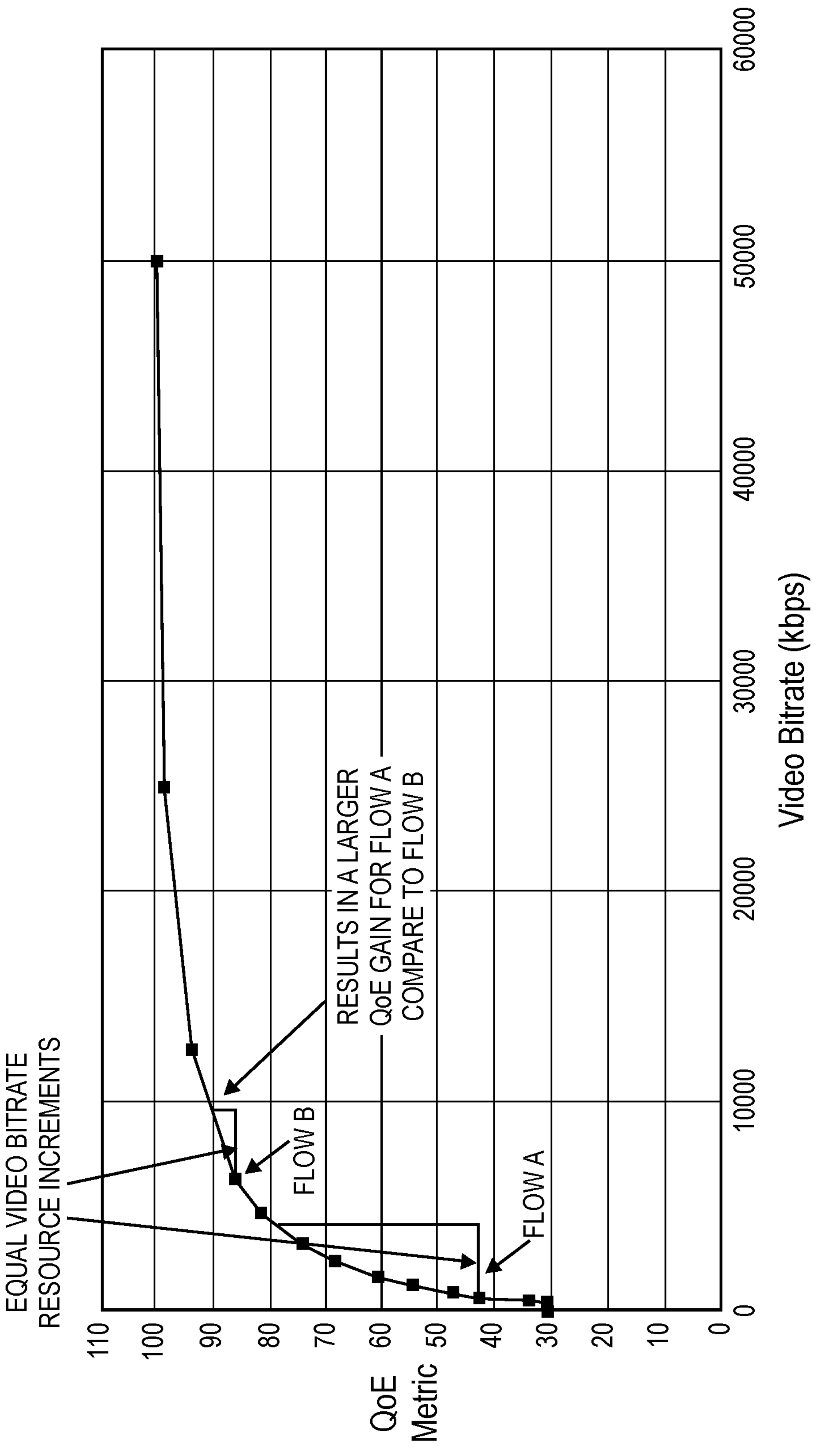
FIG. 2 is a diagram of a graph that is representative of the data encoded in a QoE map.

In some embodiments, the FQC 109 uses a QoE map to determine how available network resources are to be allocated or shared to achieve an applicable policy. Generally, for most video flows the video quality improves with increasing bitrate allocation until it reaches a quality level of diminishing returns. This is illustrated in the graph of FIG. 2. FIG. 2 is a diagram of a graph that is representative of the data encoded in a QoE map. In the graph of FIG. 2, a QoE that relates a bitrate to spatial quality is shown, which in this example case is a VMAF metric. The graph also provides a comparison of two flows (i.e., Flow A and Flow B) with low (i.e., Flow A) and high (i.e., Flow B) bitrate allocation. Allocating the same amount of extra bandwidth (i.e., increasing each Flow's bitrate) to the two flows results in a larger QoE gain for the low bitrate Flow A. This example illustrates the importance of QoE awareness that the embodiments address when allocating network resources. In this example, the QoE of Flow A and Flow B are determined by the same QoE maps. In other cases, different QoE maps can be used for different flows such as Flow A and Flow B.

The FQC 109 can handle network resources in terms of bitrate and other resource allocation measurements, traffic priorities, and similar considerations. Network resources at the level of time-slots can also be managed by the FQC 109. In a radio network context, the FQC 109 can manage network resource allocation at the level of subcarriers. In some embodiments, the FQC 109 can allot network resources according to a QoE policy, or similar traffic prioritization scheme. The QoE policy can specify how the QoE maps are used for choosing how to perform network resource allocation. QoE policies can be dynamically programmed or fixed. Examples of QoE policies can include a maximum aggregate QoE policy, a QoE fairness policy, a QoE service level agreement (SLA), or similar policy. A maximum aggregate QoE policy directs the FQC 109 such that flows are allocated network resources to maximize the sum of the QoE metric values across all of the flows. A QoE fairness policy directs the FQC 109 to allocate network resources to flows in a way to equalize the QoE metric value of each flow. A QoE SLA is a policy that specifies the level of QoE in terms of the QoE metric value. The FQC 109 can be provided any of these policies, combinations thereof, or similar policies. Any variety and complexity of policies can be defined for the FQC 109 to implement.

In some examples, a policy can set limits on how much network resources can be allocated to a particular flow, in order to protect the quality of other flows. For example, in case of radio network resources, a flow to a user device with poor radio conditions may require a lot of bandwidth to achieve a certain level of QoE. In such cases, the policy may direct FQC 109 to reject that flow or to provide a fixed network resource allocation. Such a policy decision can be taken during establishment of the flow or during the lifetime of the flow. For example, if an application in use on a mobile device is experiencing a deteriorating radio condition, the application or the flow to the application can be paused or stopped. For critical applications, safety measures can be applied to safely shut down the application.

Figure 3:
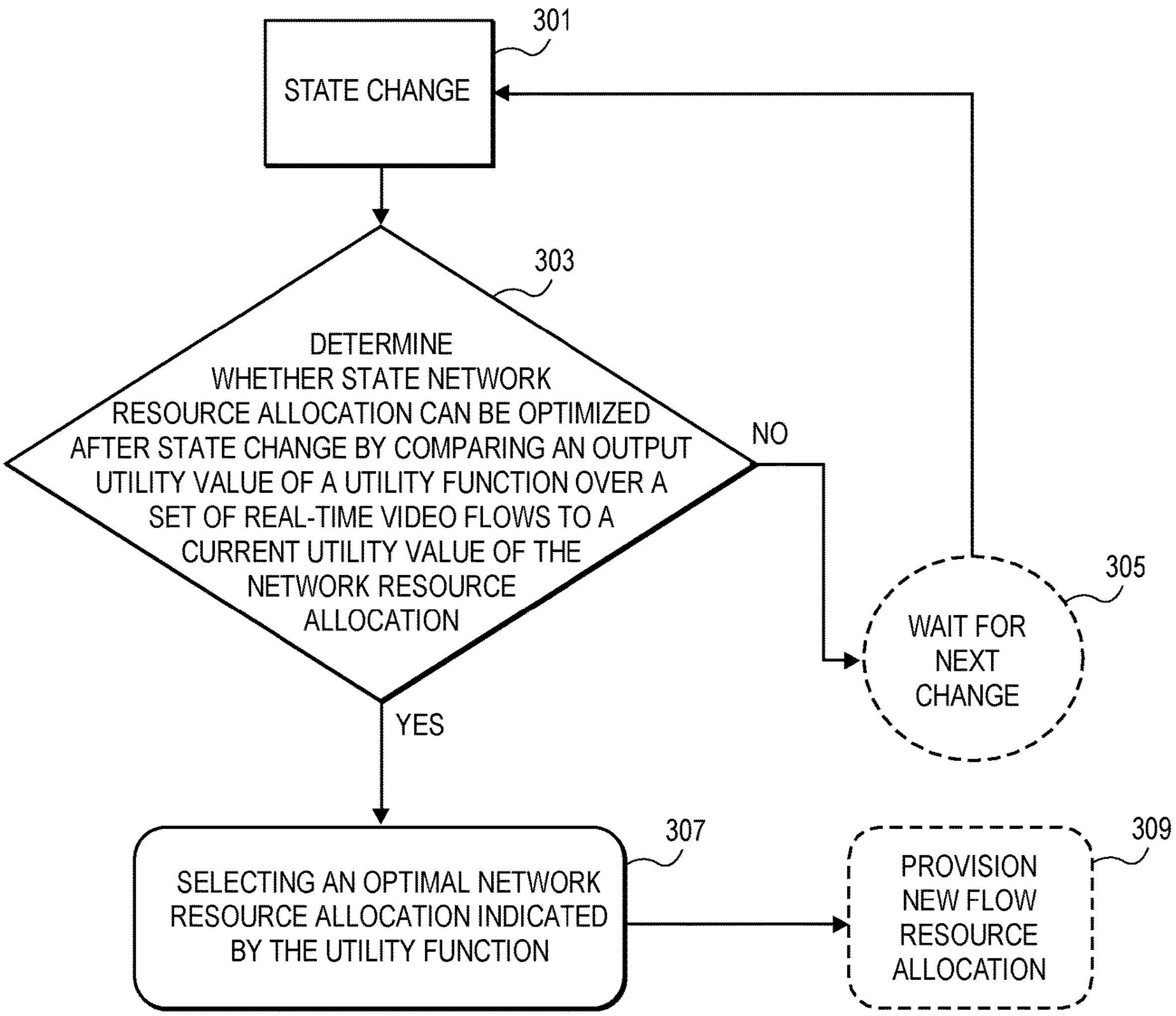
FIG. 3 is a flowchart of one embodiment of the operation of the flow QoE controller (FQC).

FIG. 3 is a flowchart of one embodiment of the operation of the FQC. The flowchart illustrates how a FQC handles state changes for resource, policies, and flows. A FQC can support handling of an array of state changes including but not limited to flows being added or removed, QoE map changes for a flow, network resource changes, e.g., more bandwidth added or removed, policies added, removed, or changed. The FQC can monitor these components or resources (e.g., the network resource availability) to detect changes in state, can be notified of changes in the state of these components or resources, or any combination thereof (Block 301).

In response to detecting or being notified of each state change, the FQC will perform an evaluation to determine if an update to the network resource allocation should be performed (Block 303). If a network resource allocation is not needed, then the process of the FQC waits for the next state change (Block 305). The determination of the need for network resource allocation can be based on determining whether optimization of the network resource allocation is possible. The determination of whether optimization is possible can compare a utility value (i.e., an output) of a utility function over the set of real-time video flows in light of the state change to a current utility value of the network resource allocation. The FQC can perform a set of computations using the utility function based on a range of possible configurations for the updated state of the flows, using updated or current QoE maps, resources, and policies. The network resource allocation with a highest or optimal utility value from this set of computations is then selected to be a new network resource allocation (Block 307).

For example, if the FQC is implementing a policy to maximize the aggregate QoE metric values across the flows, then the FQC determines and chooses a network resource allocation that maximizes a 'utility' expressed as:

$$\text{Utility} = \sum_{flow} QoE(\text{flow})$$

The updated network resource allocation can be determined through algorithmic or heuristic methods. The FQC can check whether policies have been defined that limit the amount of resources that may be allocated to a single flow to avoid allocating a large amount of resources for a flow experiencing poor radio channel conditions or for similar reasons. Based on the selected network resource allocation, resources will be added or removed (i.e., provisioned) from flows (Block 309).

The network resource allocation can involve more than one metric. For example, where bitrate is the primary metric, delay and jitter will increase as the aggregate bitrate gets close to filling up the total radio resource capacity. A tradeoff between bitrate and delay is balanced by allocating a portion of the total capacity to the application flows to ensure sufficiently low delay and jitter. In one embodiment, applicable for example with the QoE maps determined solely by a bitrate to VMAF mapping, the portion size is determined by targeting a fixed sufficiently low delay and jitter target to limit QoE impacts.

In another embodiment, applicable with QoE maps that include a temporal and/or input component, the process explores different portion sizes and picks the one with the best QoE result. For example, the QoE map can take the bitrate as parameter while the application will choose the frame rate for a given bitrate. To allow for optimization involving changing frames per second (fps) or resolution, a QoE map could be defined with bitrate ranges using different fps or resolution, but it would be up to the application to act on a bitrate update by changing fps or resolution. One condition on the QoE map is that it must be strictly increasing with increasing bitrate so that it will not be possible to have the same value for different bitrates.

When changes to bitrate allocations are made, for example due to a request for a new flow, the process determines the new bitrates that are optimal based on the modeling involving QoE maps and available capacity. As new information becomes available, for example radio channel condition change, then the algorithm will run again and make new changes. If the delay and jitter increase to negatively impact the QoE then the algorithm will reduce the aggregate bitrate allocation.

Figure 4:
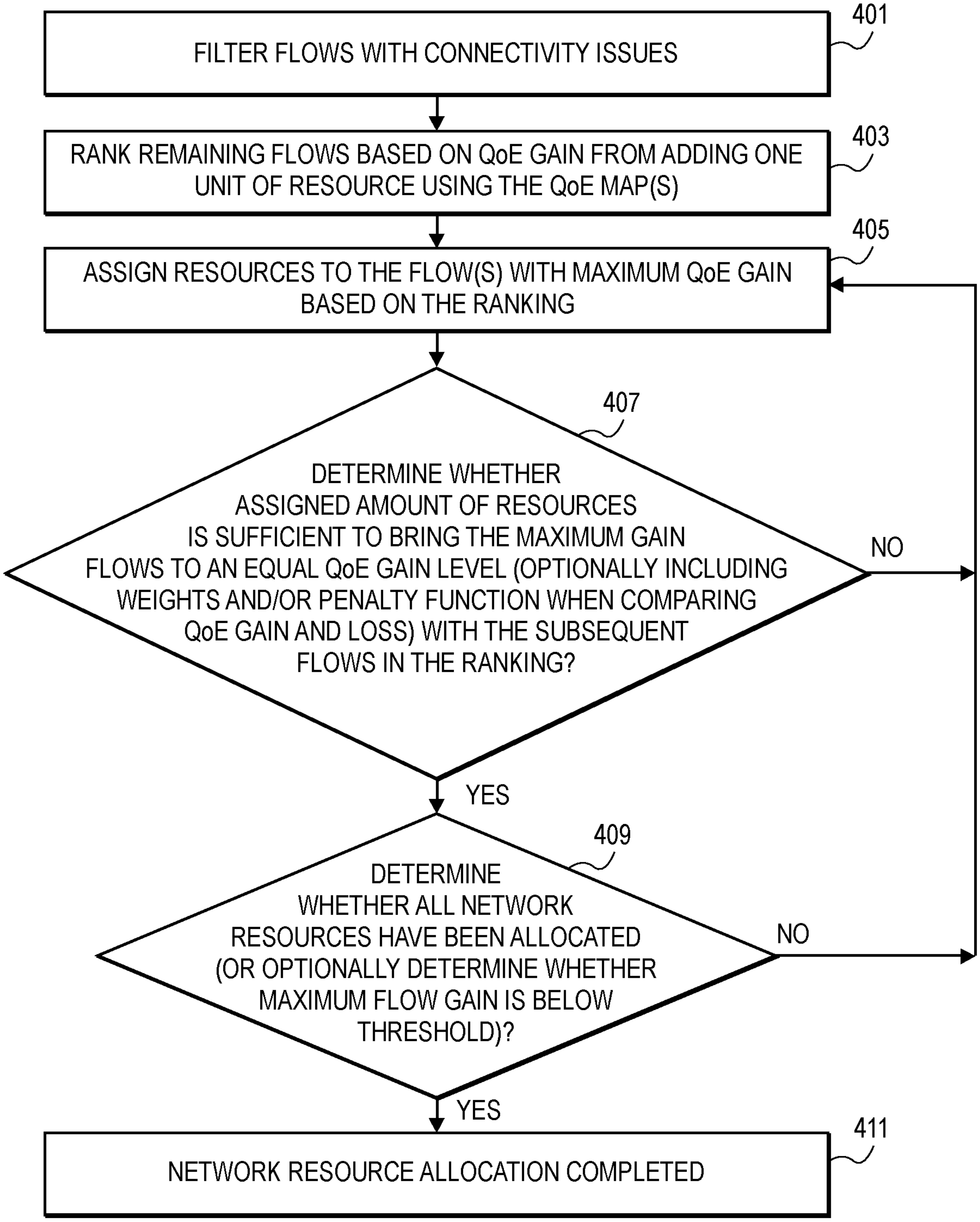
FIG. 4 is a flowchart of one embodiment of a process for network resource allocation.

FIG. 4 is a flowchart of one embodiment of a process for network resource allocation. In the example illustrated embodiment, the allocating network resources can be triggered as part of the computation of new network resource flow allocation described in relation to FIG. 3 (Block 307). In some embodiments, the process can filter flows with connectivity issues (e.g., poor radio condition where a measured signal to noise ratio (SNR) or signal to interference and noise ratio (SINR) is below a fixed threshold or similar indicator is present), or where the network resource allocation is fixed by policies or similar considerations (Block 401). The network resource allocation process can then order or rank the flows based on QoE gain from adding one unit of a network resource to that flow, which is estimated using the QoE map selected for that flow (Block 403). Network resources can be allotted in any unit using any metric or sizing consistent with the mapping (Block 405). The process can iterate over the assignment of single units of network resources until all of the network resources available are allotted.

Each step of the iterative process can assign a unit or equal set of units of network resources to the flows with maximum QoE gain based on ordering or ranking (i.e., the units are assigned in the order of the ranking). As the units of network resources are assigned, a determination is made whether an amount of network resources has been assigned to the flows that is sufficient to bring the maximum gain flows to an equal QoE gain level with the subsequent flows (i.e., the lower gain flows) in the given ordering (Block 407). The flows can be re-ranked or ordered in each iteration if the relative gain between the flows shift.

In some embodiments, the process can optionally use weights and/or penalty functions when comparing QoE gain and loss. Each flow can be assigned weightings or penalties in accordance with policies or defined characteristics for the flows. These weights can thereby ensure relationships between flows, adherence to policies (e.g., SLAs), and similar network resource allocation considerations. The network resource allocation process can repeat until there is no more available resource, which is determined on each iteration (Block 409). Optionally, to avoid using resources for diminishing QoE gain, the network resource allocation process can also terminate if the maximum flow gain for the highest ranked or ordered flow is below a given threshold indicating that network resource allocation is nearly optimal and further network resource allocation would have minimal impact. When these termination conditions are determined as being met, then the process can complete (Block 411). In some embodiments, the network resource allocation process is a distribution of free resources. In practice an incremental process may be used where resources are reallocated using the same principles.

In some embodiments the FQC is executed as a microservice in a telecommunication network cloud or edge cloud. A distributed implementation of a FQC can also be utilized to achieve scalability, redundancy, and resiliency. This does not however affect the core of the operation of the FQC. The FQC can manage radio resources for one or more radio base station nodes, but any given base station's resources are managed by just one active FQC at any given moment (i.e., 1:N relationship). The FQC can be run as an active/standby pair, where the active FQC periodically synchronizes flow state, resource allocations, QoE maps, and any other necessary runtime state, to a hot standby FQC. Determining the death of the active FQC and switchover to the standby is implemented in a cluster controller and/or cloud management system such as Kubernetes or using similar implementations.

EXAMPLE EMBODIMENTS

In one embodiment, a method allocates network resources among a number of real-time video flows in a way that maximizes the total utility measured in terms of quality of experience (QoE). The utility function is the sum of the QoE metric value for each flow.

$$\text{Utility} = \sum_{flow} QoE(\text{flow})$$

In another embodiment, the utility function is the sum of the QoE metric value for each flow and a penalty function for impacting flows with QoE metric below a certain threshold. This is useful in attempting to keep a service level agreement expressed in terms of a minimum level of QoE. The penalty function may be chosen as a step function with a step at the QoE threshold.

$$\text{Utility} = \sum_{flow} QoE(\text{flow}) - \text{penalty}$$

The utility function includes a penalty component for variation in QoE across flows to introduce fairness in terms of QoE. For example, the formula below could be used with some positive weight w $$\text{Penalty} = w \times \frac{2}{n(n-1)} \sum_{\substack{unique\ pairs \\ flow1, flow2 \\ flow1 \neq flow2}} |QoE(\text{flow1}) - QoE(\text{flow2})|$$

or in terms of an estimate for the standard deviation $$\text{Penalty} = w \times \sqrt{\frac{1}{n-1} \sum_{flow} (QoE(\text{flow}) - AverageQoE)^2}$$

In some embodiments, the method puts a limit on the amount of radio resources that can be allocated to a single flow to prevent flows with bad radio conditions from using excessive resources. The method limits the maximum QoE per flow. The resource limit may be set by policy to impose a ceiling on the maximum amount of resources per flow. This can be useful to prevent the allocation of additional resources resulting in small gain in QoE. The method can alternatively or in addition put a lower threshold on the gain in QoE relative to the added resources. These mechanisms can make the system more energy efficient.

In some embodiments, the QoE metric used by the method is the sum of metrics for spatial, temporal and input quality metric (or a subset of these). The spatial metric can be VMAF. The bitrate to VMAF map is to map between bandwidth resources and spatial QoE metric. P.1204.3 can be used to map between bandwidth resources and spatial QoE metric. Utility can be influenced by the class of the user (e.g., gold, silver, bronze) so that users belonging to a higher class will experience a relatively higher QoE. This can be achieved by using the formula below with weights $w_{gold} > w_{silver} > w_{bronze}$ $$\text{Utility} = w_{gold} \times \sum_{gold\ flows} QoE(\text{flow}) + w_{silver} \times \sum_{silver\ flows} QoE(\text{flow}) + w_{bronze} \times \sum_{bronze\ flows} QoE(\text{flow})$$

Utility can be determined based on criticality of service. Services that are critical for ensuring safety and security will experience a relatively higher QoE. This can be achieved using weights as in the Utility formula above. The method allocates one or more partitions (or slices) of the total network resources, where each partition is allocated a fixed amount of resources for flows assigned to it via policy. A separate partition may be allocated for best effort traffic.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The networking software 520 can include the FQC 565 and related components that include the functionality of the embodiments as described herein.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

In some embodiments, the software 550 can include the FQC 565 and related components that include the functionality of the embodiments as described herein.

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where “source port” and “destination port” refer herein to protocol ports, as opposed to physical ports of a ND), transport protocol (e.g., user datagram protocol (UDP), Transmission Control Protocol (TCP), and differentiated services code point (DSCP) values.

Figure 5C:
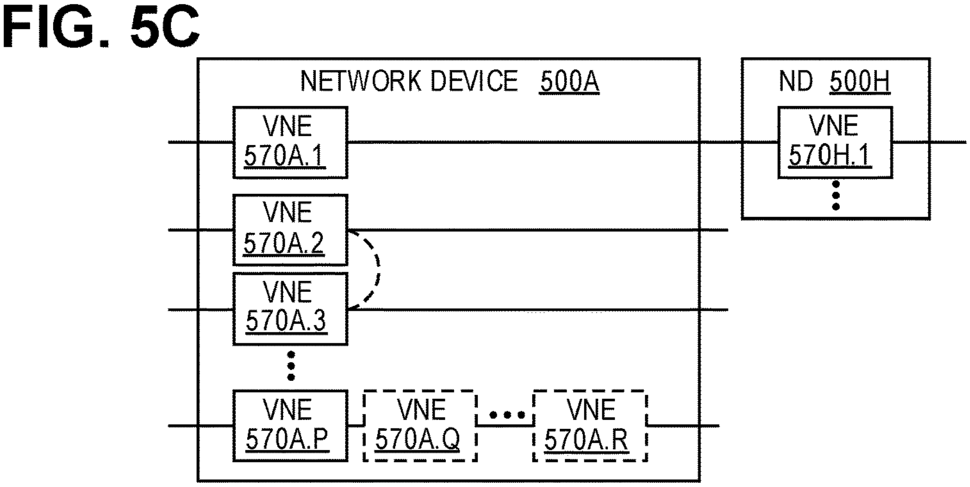
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A. Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
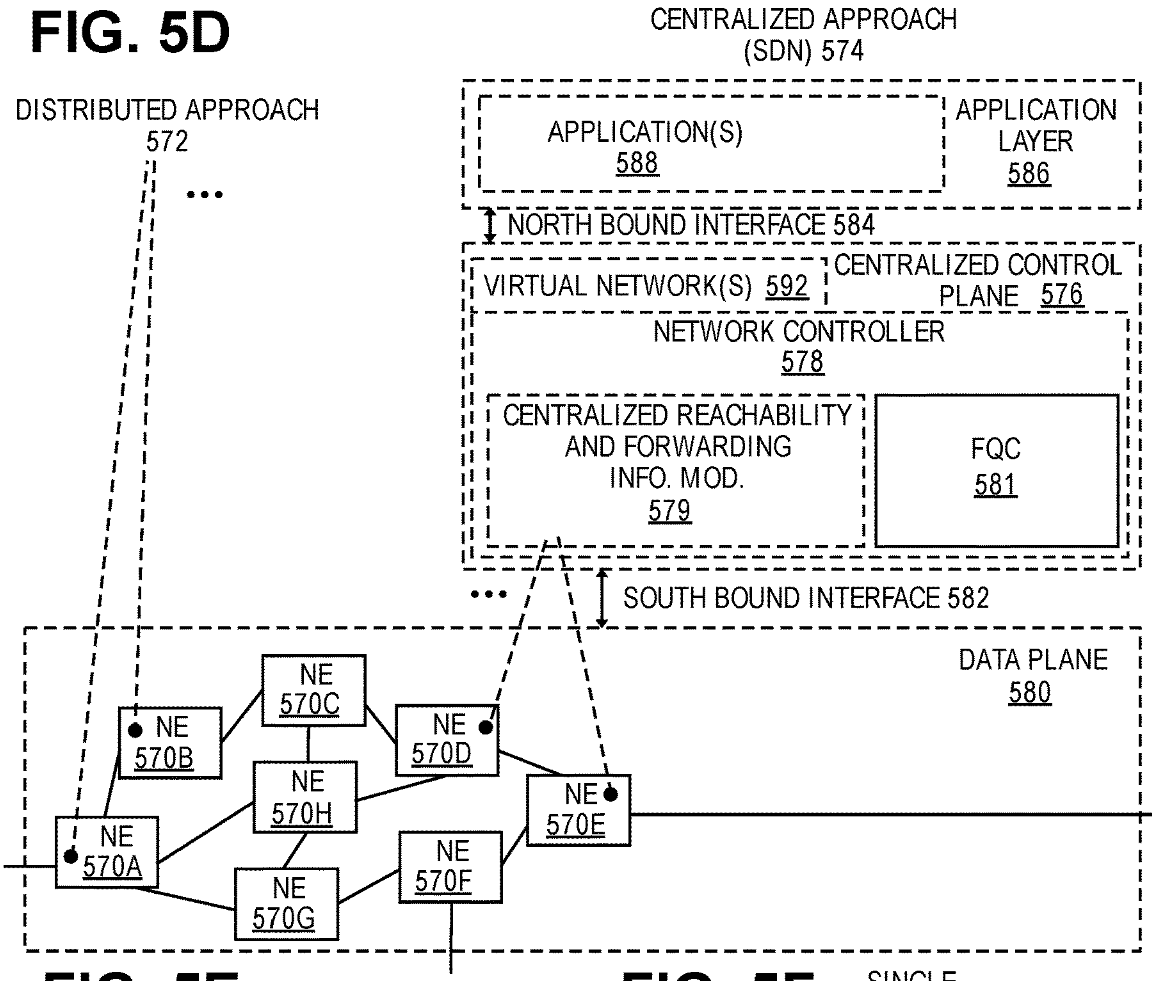
FIG. 5D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straightforward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

The network controller 578, application layer 586 or similar aspect of the centralized approach 574 can include the FQC 581 and related components that include the functionality of the embodiments as described herein.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information-albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information-albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574 but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively, or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
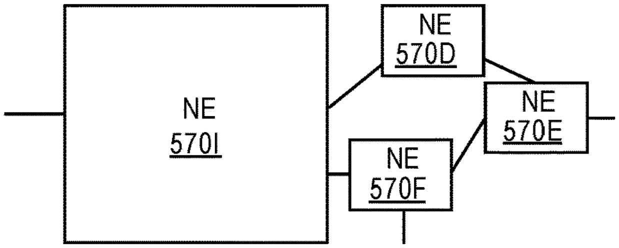
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
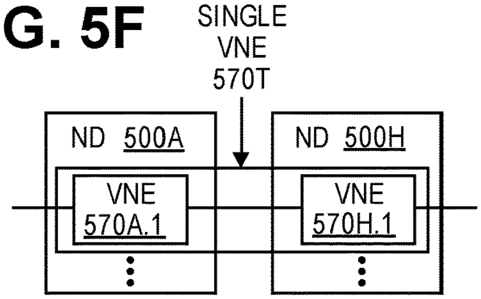
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
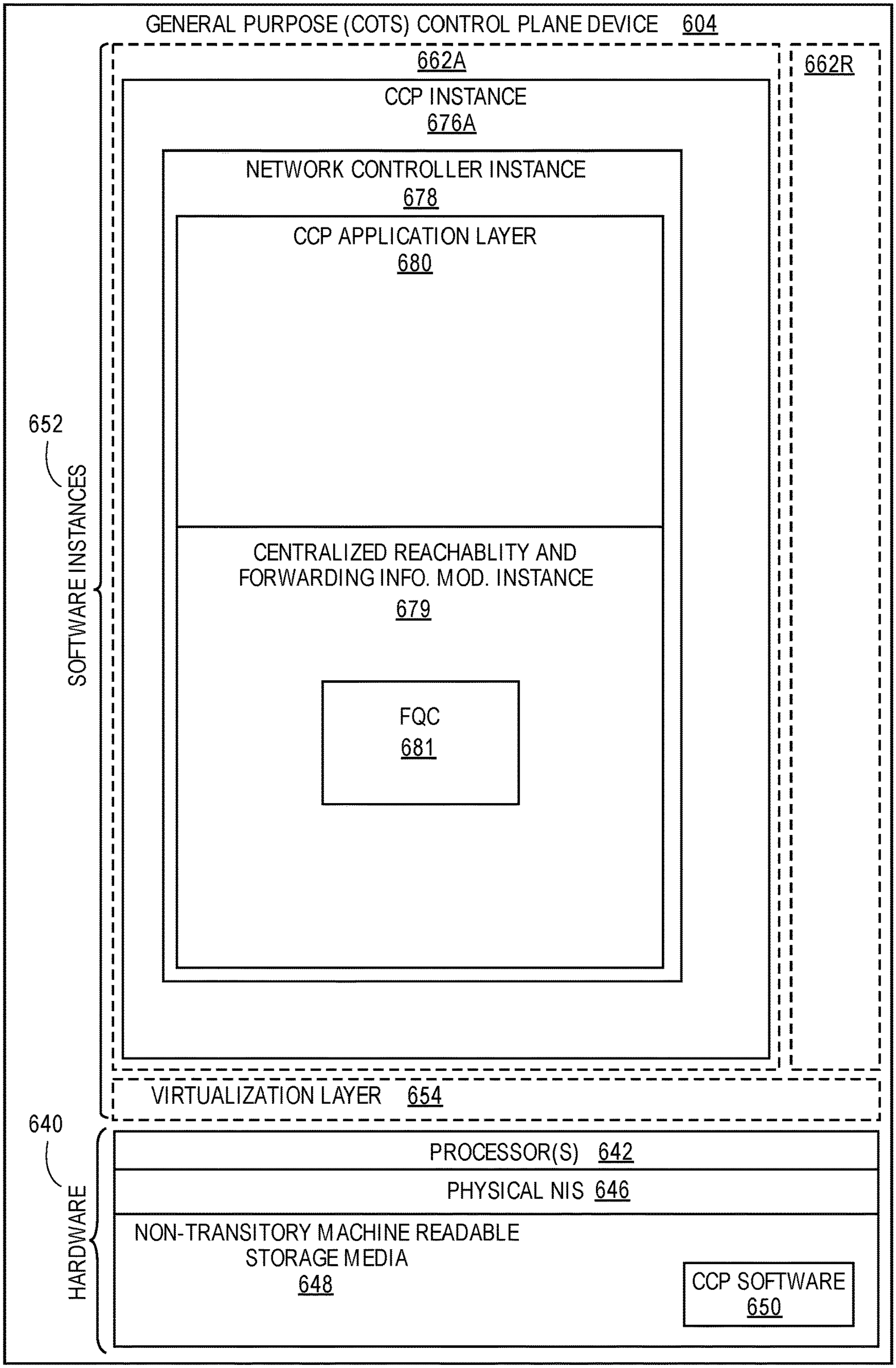
FIG. 6 illustrates a general purpose control plane device with centralized control plane (CCP) software, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650.

The non-transitory machine-readable medium 648 and/or software of the control plane device 604 can include the FQC 681 and related components that include the functionality of the embodiments as described herein.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path-multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for allocating network resources among a set of real-time video flows to maximize a total measured quality of experience (QoE), the method comprising:
- detecting a state change;
- determining whether a network resource allocation can be optimized after the state change, where the determining compares an output utility value of a utility function over the set of real-time video flows to a current utility value of the network resource allocation; and
- selecting an optimal network resource allocation indicated by the utility function, in response to determining the network resource allocation can be optimized after the state change.

2. The method of claim 1, wherein the utility function is a sum of estimated QoE values for the set of real-time video flows, where QoE maps provide estimated QoE values for each network resource allocation for each real-time video flow in the set of real-time video flows.

3. The method of claim 2, wherein the utility function is further the sum of the estimated QoE values with an output of a penalty function.

4. The method of claim 1, wherein the utility function is weighted based on a class of service associated with each real-time video flow in the set of real-time video flows.

5. The method of claim 1, further comprising:
- allocating one or more partitions of total network resources, where each partition is allocated a fixed amount of resources for real-time video flows assigned to the partition via policy.

6. The method of claim 1, further comprising:
- ranking each real-time video flow in the set of real-time video flows based on QoE value gain for adding one unit of network resources to each real-time video flow in the set of real-time video flows.

7. The method of claim 6, further comprising:
- assigning at least one unit of network resources to a highest ranking real-time video flow that has a greatest QoE gain in a ranking.

8. A non-transitory machine-readable storage medium comprising computer program code which when executed by a computer perform operations for allocating network resources among a set of real-time video flows to maximize a total measured quality of experience (QoE) comprising:
- detecting a state change;
- determining whether a network resource allocation can be optimized after the state change, where the determining compares an output utility value of a utility function over the set of real-time video flows to a current utility value of the network resource allocation; and
- selecting an optimal network resource allocation indicated by the utility function, in response to determining the network resource allocation can be optimized after the state change.

9. The non-transitory machine-readable storage medium of claim 8, wherein the utility function is a sum of estimated QoE values for the set of real-time video flows, where QoE maps provide estimated QoE values for each real-time video flow in the set of real-time video flows.

10. The non-transitory machine-readable storage medium of claim 9, wherein the utility function is further the sum of the estimated QoE values with an output of a penalty function.

11. The non-transitory machine-readable storage medium of claim 8, wherein the utility function is weighted based on a class of service associated with each real-time video flow in the set of real-time video flows.

12. The non-transitory machine-readable storage medium of claim 8, wherein the computer program code further performs operations comprising:
- allocating one or more partitions of total network resources, where each partition is allocated a fixed amount of resources for real-time video flows assigned to the partition via policy.

13. The non-transitory machine-readable storage medium of claim 8, wherein the computer program code further perform operations comprising:
- ranking each real-time video flow in the set of real-time video flows based on QoE value gain for adding one unit of network resources to each real-time video flow in the set of real-time video flows.

14. An apparatus for allocating network resources among a set of real-time video flows to maximize a total measured quality of experience (QoE), the apparatus comprising:
- one or more processors; and
- a storage medium that contains instructions which, when executed by the one or more processors, will cause the apparatus to perform operations to:
  - detect a state change;
  - determine whether a network resource allocation can be optimized after the state change, where the determining compares an output utility value of a utility function over the set of real-time video flows to a current utility value of the network resource allocation; and
  - select an optimal network resource allocation indicated by the utility function, in response to determining the network resource allocation can be optimized after the state change.

15. The apparatus of claim 14, wherein the utility function is a sum of estimated QoE values for each video flow in the set of real-time video flows, where QoE maps provide estimated QoE values for each real-time video flow in the set of real-time video flows.

16. The apparatus of claim 15, wherein the utility function is further the sum of the QoE values with an output of a penalty function.

17. The apparatus of claim 14, wherein the utility function is weighted based on a class of service associated with each real-time video flow in the set of real-time video flows.

18. The apparatus of claim 14, further to perform operations to:

allocate one or more partitions of total network resources, where each partition is allocated a fixed amount of resources for real-time video flows assigned to the partition via policy.

19. The apparatus of claim 14, further to perform operations to:

rank each real-time video flow in the set of real-time video flows based on QoE value gain for adding one unit of network resources to each respective real-time video flow.

20. The apparatus of claim 19, further to perform operations to:

assign at least one unit of network resources to a highest ranking real-time video flow that has a greatest QoE gain in a ranking.

* * * * *